United States Patent [19]
Duffy et al.

[11] Patent Number: 5,620,520
[45] Date of Patent: Apr. 15, 1997

[54] APPARATUS FOR PRODUCING COATED FASTENERS HAVING CLOSED ENDS

[75] Inventors: Richard J. Duffy, Shelby Township; Eugene D. Sessa, Mt.Clemens, both of Mich.

[73] Assignee: Nylok Fastener Corporation, MaComb, Mich.

[21] Appl. No.: 269,172

[22] Filed: Jun. 30, 1994

Related U.S. Application Data

[63] Continuation-in-part of Ser. No. 849,741, Mar. 12, 1992, abandoned.

[51] Int. Cl.⁶ .......................... B05C 19/06; B05C 19/04; B05B 1/28; B05B 7/14
[52] U.S. Cl. .................. 118/677; 118/687; 118/681; 118/308; 118/317; 118/323; 118/326; 141/65
[58] Field of Search ........................ 118/677, 687, 118/681, 704, 308, 317, 323, 324, 500, 501, DIG. 10, 326; 239/120, 124, 281; 141/65, 7, 8, 312, 383

[56] References Cited

U.S. PATENT DOCUMENTS

| | | | |
|---|---|---|---|
| 2,825,190 | 3/1958 | Heald | 118/681 |
| 3,285,299 | 11/1966 | Henry et al. | 141/312 |
| 3,422,795 | 1/1969 | Smith | 118/317 |
| 3,452,714 | 7/1969 | Burke et al. | |
| 3,530,827 | 9/1970 | Burke | |
| 3,562,327 | 2/1971 | Sessa et al. | 118/308 |
| 3,687,651 | 8/1972 | Scholes | 118/317 |
| 3,731,724 | 5/1973 | Dorflinger | |
| 3,766,584 | 10/1973 | Dorflinger | |
| 3,894,509 | 7/1975 | Duffy et al. | |
| 3,901,181 | 8/1975 | Vornberger | 118/681 |
| 3,995,586 | 12/1976 | Crose et al. | 118/317 |
| 4,100,882 | 7/1978 | Duffy et al. | |
| 4,779,559 | 10/1988 | Gould et al. | 118/317 |
| 4,835,819 | 6/1989 | Duffy et al. | |
| 4,899,516 | 2/1990 | Krieger et al. | 118/317 |
| 5,052,338 | 10/1991 | Maiorca et al. | 118/668 |
| 5,090,355 | 2/1992 | DiMaio et al. | 118/308 |
| 5,141,774 | 8/1992 | Prittinen et al. | 118/317 |
| 5,173,325 | 12/1992 | Knobbe et al. | 118/317 |
| 5,201,973 | 4/1993 | Castaldo et al. | 118/680 |

FOREIGN PATENT DOCUMENTS

| | | | |
|---|---|---|---|
| 2554396 | 6/1976 | Germany | 118/317 |
| 591231 | 2/1978 | U.S.S.R. | 118/317 |
| 654305 | 4/1979 | U.S.S.R. | 118/317 |
| 657861 | 4/1979 | U.S.S.R. | 118/317 |

*Primary Examiner*—Donald E. Czaja
*Assistant Examiner*—Steven P. Griffin
*Attorney, Agent, or Firm*—Niro, Scavone, Haller & Niro

[57] ABSTRACT

An apparatus for coating internally threaded fasteners, particularly closed end fasteners, such as flanged weld nuts, which includes a powder spray arrangement, has a spray nozzle within a spray cylinder. The spray nozzle arrangement is actuated by an air cylinder to be in abutting relationship with a fastener seated in the spray position. The spray nozzle is tapped for the supply of air and for the supply of powder to the fastener threads. The spray block on which the nut is sprayed has a vacuum line that exhausts excess powder that does not adhere to the threads.

16 Claims, 4 Drawing Sheets

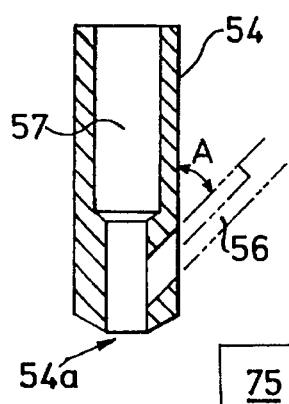
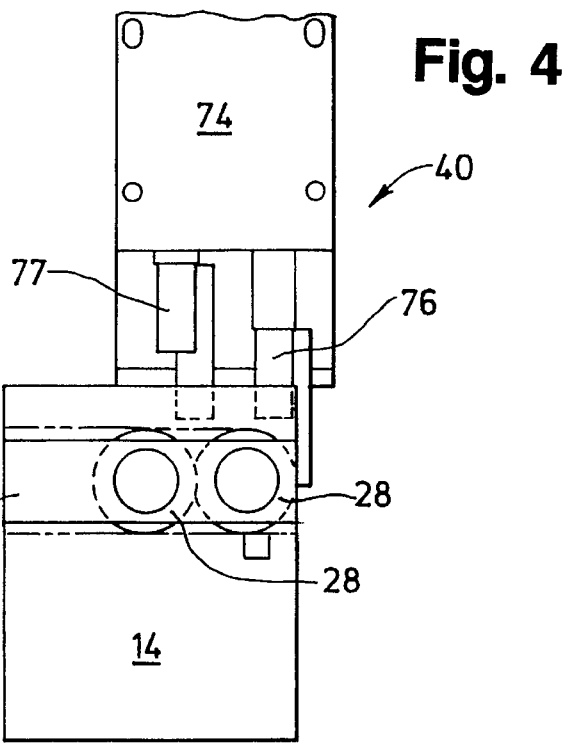
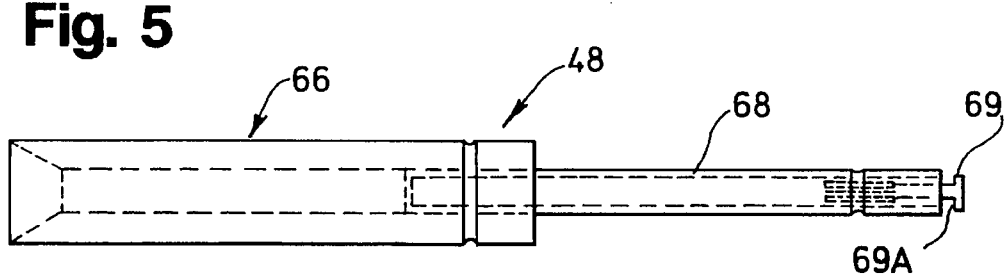
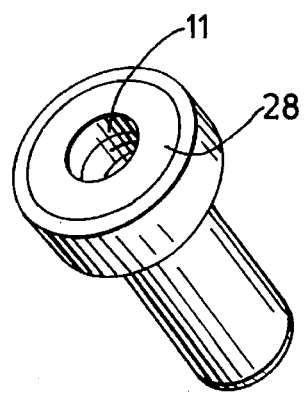

ced fasteners having closed ends"># APPARATUS FOR PRODUCING COATED FASTENERS HAVING CLOSED ENDS

BACKGROUND OF THE INVENTION

This is a continuation-in-part application of Ser. No. 07/849,741, filed Mar. 12, 1992, now abandoned.

The present invention relates to an improved apparatus and process for the manufacture of threaded fasteners having a coating applied to the threads. More particularly, this invention relates to an apparatus and method for the manufacture of coated fasteners where it is necessary to coat the internal threads of a fastener that are not easily accessible, such as those found in a closed end fastener, specifically a closed end nut.

Prior art patents disclose various methods and devices for applying locking patches or coatings of resilient resin. Generally, a rotatable table or endless belt conveyor is disposed to receive fasteners and transport them through a plurality of stations to effect application of the coating. Examples of such disclosures include U.S. Pat. Nos. 4,100,882 and 4,835,819 issued to Duffy et al.

In the past, attempts have been made to develop machines that could produce individual or small quantities of sample product as well as providing high volume production equipment with increased processing speeds and increased versatility at reduced costs. The attempts, however, have resulted in machines that were makeshift, not compact, and difficult to regulate. Some of these problems, are disclosed in U.S. Pat. No. 4,835,819, which is incorporated herein by reference.

Each of the foregoing prior art patents disclose an apparatus for the application of a coating to a fastener that has threads that may be accessed, from both the top and bottom of the fastener. Such dual access is important because it enables the spray coating nozzle to have access to one open end of the fastener while the other end remains open for removal of excess coating material by a vacuum. However, a problem arises when the fastener to be coated does not have two open ends.

Such a problem persists in the coating of enclosed fasteners such as closed end flanged weld nuts. Since there is only one aperture for access to the threads, a spray nozzle cannot enter one end of the nut while a vacuum removes excess coating material or powder from the other open end. As in the process of coating any fastener, the need to remove excess powder during the coating of the flanged weld nut remains. However, the prior art structures are poorly suited to the application of powder to threads of an enclosed fastener, such as a flanged weld nut, because the spray nozzle and vacuum access the fastener from different open ends of the fastener. It is also contemplated that the principles of the present invention may be used to more efficiently and economically apply powder to coat the threads of open ended threaded fasteners.

SUMMARY OF THE INVENTION

The present invention preserves the advantages of prior art devices for producing coated fasteners. In addition, it provides new advantages not found in currently available structures for producing coated fasteners, and overcomes many of the disadvantages of such currently available devices.

The above objects and others, which will become apparent in the description, are achieved by providing a new and novel apparatus for coating fasteners, such as closed end flanged weld nuts, as well as coating fasteners open at both ends. The invention is generally directed to an apparatus that may coat the threads of a closed end fastener, as well as fasteners open at both ends, and maintain speed and efficiency as well as the ability to remove excess powder.

In particular, the new and novel apparatus for producing coated fasteners of the preferred embodiment includes a means for removing excess powder from the same aperture into which a spray nozzle is inserted for application of material onto the internal threads. An air cylinder actuates the movement of a spray nozzle arrangement into engagement with the open end of a closed-end flanged weld nut which is seated in a spray block. The spray nozzle arrangement includes a spray nozzle disposed in a cylinder. The spray nozzle is tapped for the supply of air and the supply of powder to be sprayed. Air continuously flows through the spray nozzle and, when a fastener is in proper position for spraying, powder is supplied to the spray nozzle where it mixes with the air. The powder exits the tip of the spray nozzle onto the threads of the fastener. A vacuum exhaust is provided just prior to the end of the cylinder line to create a vacuum. As a result, excess powder is removed from the threads of the fastener through the exhaust.

There is also provided a means for maintaining the spray nozzle arrangement in abutment with the fastener seated in the spray block. Further, a means for actuating the spray nozzle within close proximity of the internal threads of the fastener is provided so as to provide a high quality coating or patch.

Another aspect of the invention includes an escapement mechanism that operates from the side of the spray block to hold the fastener to be coated. The escapement mechanism includes a first piston to hold back the stack of incoming fasteners along the feed track. A second piston retracts so that the completed nut may be released by gravity or by air assist. The second piston extends and then the first piston retracts to allow the next fastener to be fed into the spray position.

Accordingly, an object of the present invention is to provide an apparatus for coating closed end fasteners with limited access to the internal threads.

Another object of the invention is to provide an apparatus for coating fasteners where removal of excess powder during the coating process occurs through the same aperture of the fastener as does spraying of the powder.

A further object of the invention is to provide an apparatus for the application of powder to the threads of a closed end fastener which has an escapement assembly for controlling the passage of fasteners through the spray block from the feed line.

Yet another object of this invention is to mask any projection on the fastener by the configuration of the vacuum exhaust nozzle.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 3 is a side view of the vacuum nozzle of the present invention;

FIG. 4 is a top view of the escapement valve mechanism of the invention;

FIG. 5 is a side view of the spray nozzle used in the apparatus of the present invention;

FIG. 6 is a perspective view of a closed end fastener;

DESCRIPTION OF THE PREFERRED EMBODIMENTS

Figure 1:
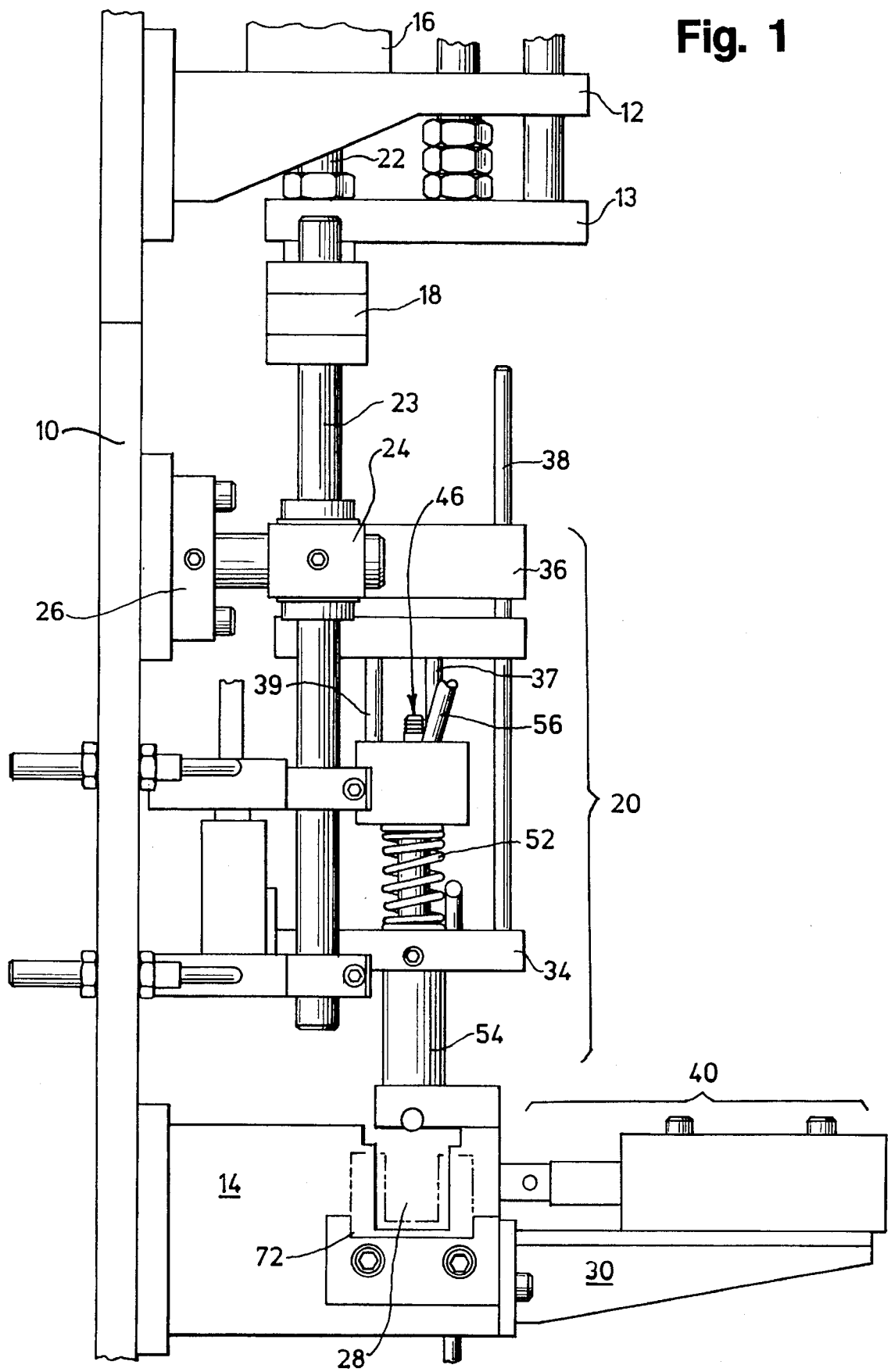
FIG. 1 is a side view of the entire apparatus for producing coated fasteners of the present invention with spray nozzle in the down position.
Figure 2:
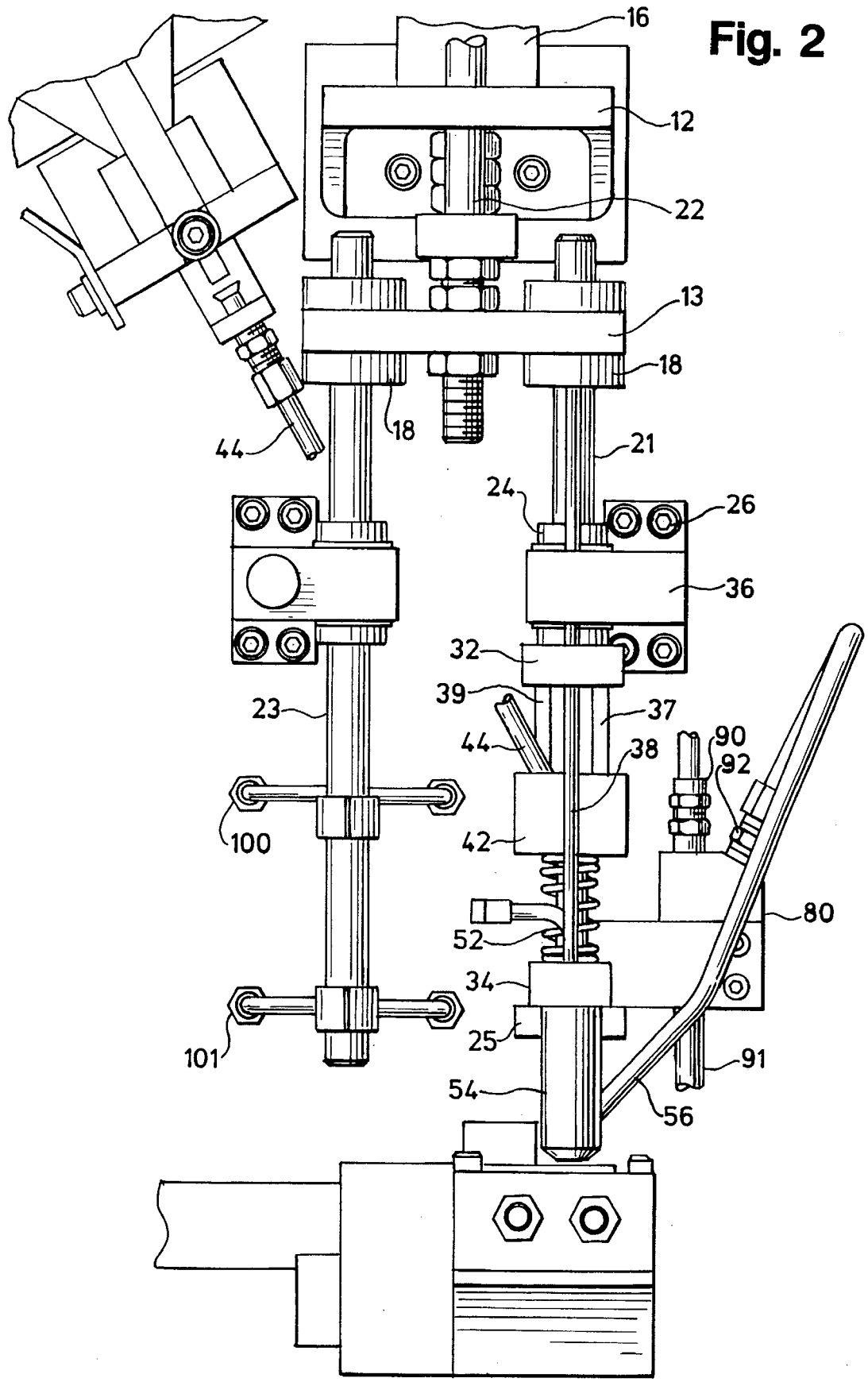
FIG. 2 is a front view of the apparatus of FIG. 1 with the spray nozzle in the up position.

In FIG. 1, a side view of the entire apparatus of the invention is shown, while FIG. 2 shows a front view of the entire apparatus. The apparatus includes frame 10 on which the apparatus is mounted. Upper bracket 12 supports a cylinder 16, such as an ALLENAIR® cylinder, which provides the actuation means for the apparatus. Depending down from upper bracket 12 is actuating rod 22 which is connected to cylinder 16. Actuating rod 22 is connected to lower bracket 13. A first linkage arrangement 18 connects lower actuating rods 21 and 23 to lower bracket 13. First linkage arrangement 18 further connects to a linear bearing arrangement 24 via actuating rod 21. This linear bearing arrangement is secured to frame 10 via lower bracket 26. Actuating rod 21 further supports spray and nozzle mechanism 20.

Also secured to frame 10 is spray block 14 which directs fasteners 28 to be coated into the proper spray position directly below spray and nozzle mechanism 20 (Fasteners 28 typically used with the apparatus of this invention may be closed end or other internally threaded fasteners having an internal diameter (for example) on the order of between approximately 0.1 and 1.5 inches.). The spray block 14 has a feed track 72 that is of a configuration particular to the size and shape of the fasteners to be coated. Additionally affixed onto spray block 14 is escapement mechanism bracket 30. Bracket 30 supports escapement mechanism 40 which is employed to control the passage of fasteners 28 through spray block 14 and within the spray position below the spray and nozzle mechanism.

Turning now to FIG. 2, plate 36 is provided to prevent rotation of the spray and nozzle arrangement 20 about actuating rod 21. Actuating rod 21 is disposed through holes in nozzle drive block 32 and vacuum nozzle support block 34. Stop 25 is securely fixed to the lower end of actuating rod 21. The stroke of the piston of cylinder 16 limits the movement of rod 21 through blocks 32 and 34. Stop 25 raises block 34 on the return stroke of the piston of cylinder 16. Anti-rotation element 36 is affixed to second rod holding linear bearing arrangement 24 and engaged with rod 38 to prevent the spray and nozzle mechanism 20 from rotating.

Figure 7:
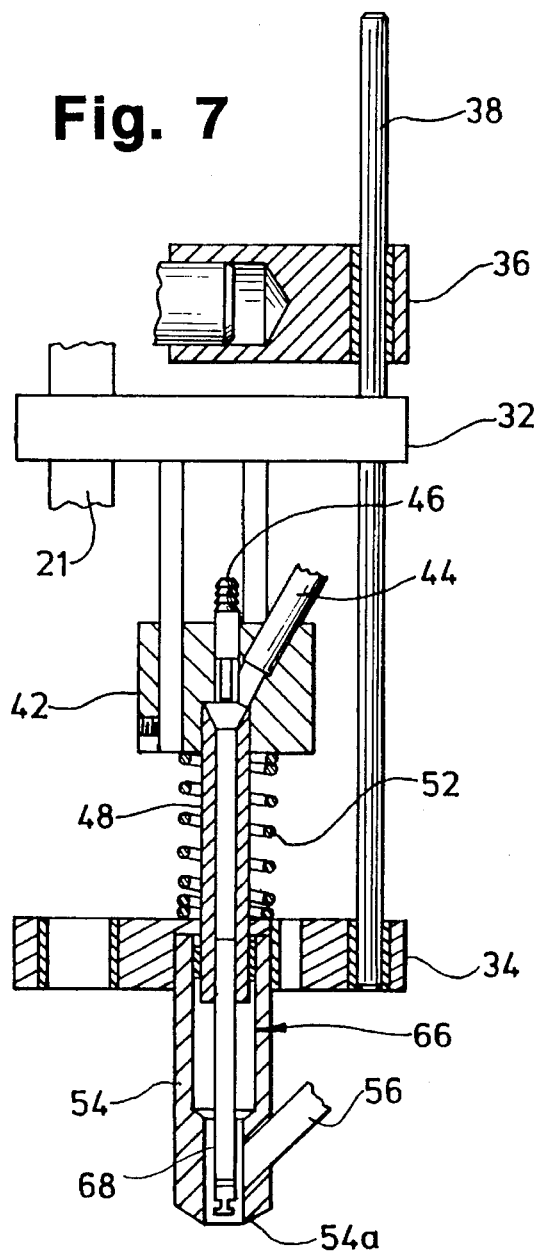
FIG. 7 is a front view of the apparatus of FIG. 1, cut away to focus on the spray/vacuum nozzle mechanism.

Depending down from nozzle drive block 32 is a set of preferably rods 37 and 39 for the mounting of powder entrainment block 42 thereon. As is best shown in FIG. 7, a powder supply tube 44 and air jet feed tube 46 are inserted into block 42. Embedded into powder entrainment block 42 from below is spray tube assembly 48. Spray tube 48 is seated in a bore in the lower surface of block 42.

Spray tube 48, as shown in FIG. 5, has a collar region 66 for direct insertion into entrainment block 42. Within collar region 66 of spray tube assembly 48 is spray nozzle 68, having an axial length, with nozzle tip 69. The powder supply tube 44 is, as described above, is inserted into the entrainment block 42 where it engages with spray nozzle 68. Air jet feed tube 46 is also inserted into entrainment block 42 where it engages with spray nozzle 68. Air is continuously flowing through spray nozzle 68, while powder from powder supply tube 44 is only supplied as needed.

As seen in FIG. 7, the entire nozzle 68 with collar region 66 is inserted through an aperture in block 34. Movement of the nozzle through block 34 is controlled by the air cylinder 16 via actuating rod 21, block 32, rod 38 and entrainment block 42. Further, nozzle 68 extends through the hole in block 34 into vacuum nozzle 54, which is inserted into a recess in the bottom portion of block 34. As also shown in FIG. 3, vacuum nozzle 54 is shown to have an inner cavity 57 for receiving nozzle 68 therein. A vacuum suction 56 is provided for the vacuum nozzle 54 at a preferable upward angle A of approximately 45 degrees from the side surface of the vacuum nozzle 54.

Referring now to FIG. 4, a top view of an escapement mechanism 40 of the present invention is shown. FIG. 4 shows the escapement mechanism 40 during the spray cycle. The escapement mechanism of FIG. 4 assures accurate alignment and retention of the fastener 28 to be coated within the spray position below the vacuum nozzle 54 and spray tube assembly 48. The operation of the escapement mechanism from the side of the apparatus is to overcome space limitations and variations in fastener configurations. The escapement mechanism 40 escapement mechanism body 74 employs spray block 14 and feed track 72 to guide the passage of a stack of fasteners 28 in a linear direction toward the spray position below vacuum nozzle 54. The rate of passage of fasteners 28 through spray block 14 through feed track 72 is critical to fast and efficient operation of the entire apparatus.

A stack of fasteners is located adjacent to one another in the feed track waiting to be coated. Although multiple nozzles may be employed to coat multiple fasteners at the same time, in the preferred embodiment, only one fastener 28 is to be coated at a time. Therefore, it is desirable to maintain only one fastener at a time in the spray position. Accordingly, the escapement mechanism 40 includes a set of two pistons 76 and 77 that operate in conjunction with one another so as to maintain back stack pressure, to isolate a single fastener for coating, to eject a coated fastener, and to move the next fastener in the stack into the spray position for coating.

In operation, when the escapement mechanism is given a signal to complete a coating cycle for a fastener 28 in the spray position, piston 76 is in an extended position holding back the stack of fasteners waiting to be coated. Piston 77 then extends into the fastener path, while piston 76 retracts allowing the just coated fastener to eject from the spray position. Piston 76 then extends back into the path of the stack of fasteners while piston 77 retracts allowing one fastener into the spray position. At this time, piston 77 extends; both pistons are now extended to isolate the fastener that is being coated. After the fastener is coated, piston 76 retracts allowing the coated fastener to proceed down the production line and the cycle repeats. Discharge from the spray block occurs due to gravity, since the entire apparatus is preferably mounted on frame 10 at an approximate angle of 30 degrees relative to the ground. Mounting the apparatus at such an angle obviates the need to tilt the entire frame.

Alternatively, discharge of the coated fastener may be accomplished through the employment of gravity with an air assist.

As shown in FIG. 2, photoelectric sensors 100 and 101, may be used for controlling functions such as the powder stream and the nut movement away from the coating location. Such sensors may be located on frame 10, and sense the position and movement of actuating rod 23 to trigger the coating cycle start, powder flow control into supply tube 44 and control of the escapement mechanism 40. Further, sensors may be selected which provide the necessary functions and allow more accurate adjustment. For example, the apparatus may include a fastener-in position/cycle start sensing system which will not allow the apparatus to cycle when the main power on/off switch has been engaged. Also, fiber optics allow a micrometer type adjustment with a direct relationship to spray stroke and the escapement cycle. This adjustment may be controlled by a sensing system containing a logic module with an output adjustable from a preferable time of 0.1 seconds to 1 second. The foregoing examples of the employment of sensors in the operation of the apparatus are provided merely as an illustration of the possible applications for sensors in such an apparatus.

In the operation of the present invention, a fastener, such as a nut, is fed from the end of a stack of nuts on feed track 72 into the spray position below the vacuum nozzle 54 and the spray nozzle 68. The nut to be coated is maintained in the spray position through the employment of escapement mechanism described above.

Before the nut 28 is positioned on the spray block 14, it is heated so that the powdered resin will adhere to the threads of the nut 28. FIG. 4 schematically depicts a heating mechanism 75, which can be any one of a number of different devices known to those of skill in the art. One such mechanism is an induction heating coil, such as that depicted in U.S. Pat. No. 5,090,355.

Once at the end of spray block 14 and in the spray position, the nut 28 interrupts a light beam emitted from fiber optic sensors 200 (FIG. 9) in the spray region which sends a signal to the cylinder 16 to extend effecting downward movement of the entire spray and nozzle arrangement 20 toward the nut 28 now in the spray position. The entire head of the apparatus descends until lower surface 54a of vacuum nozzle 54 contacts the nut. Such contact by vacuum nozzle 54 also provides centering of the nut and masks off the weld projection from possible powder or coating contamination.

Cylinder 16 continues to extend downward causing spray nozzle 68 to enter within the nut 28 and be in close proximity to its internal threads. In particular, nozzle tip 69 traverses the threaded length of nut 28 while vacuum nozzle 54 is held firmly against nut 28 by spring 52. When spray nozzle 68 is at an appropriate position within nut 28, signal is given to activate a powder supply vibrator which vibrates the powder funnel which is connected to supply tube 44 and causes powder to flow therethrough and subsequently onto the nut to be sprayed. Such a signal may be generated by fiber optic sensors or a microswitch mounted, for example, on nozzle drive block 32.

The tip 69 ensures that the powder spray is directed outwardly from the nozzle 68 toward the threads of nut 28. The preferred embodiment uses a disk-like surface 69A that deflects the air-powder stream generally perpendicular to nozzle 68 and toward the threads of nut 28. Other nozzle tip configurations are possible, including a tip that is bent in the direction of the threads, which would be more effective with larger diameter nuts.

When cylinder 16 is extended as far as desired, the stroke of the cylinder is reversed by means of a stroke adjustment mechanism attached to cylinder 16. On the retraction stroke, spray nozzle 68 is withdrawn from the nut and the powder vibrator is turned off. Vacuum nozzle 54 is disengaged from the sprayed nut and a signal is given to escapement mechanism 40 to complete the cycle by ejecting the nut from the spray position and replacing it with a new uncoated nut from the stack.

Figure 8:
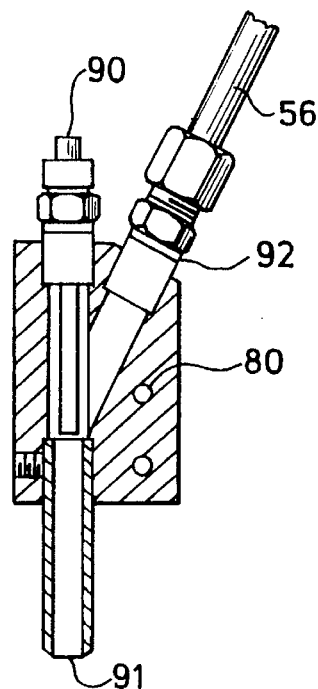
FIG. 8 is a detail of the vacuum generator.

During the entire spray cycle air is fed into air jet feed tube 46 to supply a flow of air through spray nozzle 68. It is desirable that an air flow of 8 SCFH at 65 psi be supplied into feed tube 46. As described above, vacuum nozzle also includes a vacuum suction 56. Such a vacuum nozzle coupled to a vacuum generator 80, creates a suction in the region of the spray position of a nut 28. FIG. 8 shows that vacuum generator 80 includes an air inlet 90, an exhaust 91 and a vacuum port 92. Vacuum suction 56 is connected to vacuum exhaust 92. The air flow through the vacuum generator is preferably about 50 SCFH. It is important that there is no pressure build-up in the vacuum; thus the amount of suction provided to vacuum suction 56 must be adequate to exhaust the volume of powder and air flowing through the spray nozzle. When cylinder 16 is extended as far as desired, the angled edge of vacuum nozzle 54a abuts the edge of the fastener to be sprayed, thus sealing off and creating a vacuum in the threaded area of the fastener. The position of vacuum nozzle 54 will, therefore, help to mask the weld projection of the fastener from being coated.

Any excess powder not secured to threads 11 during the coating process may be removed via suction 56. Employment of such a vacuum arrangement, that is within the same region above the nut as the spray nozzle, is particularly well suited for internally threaded closed end fasteners such as flanged weld nuts.

Figure 9:
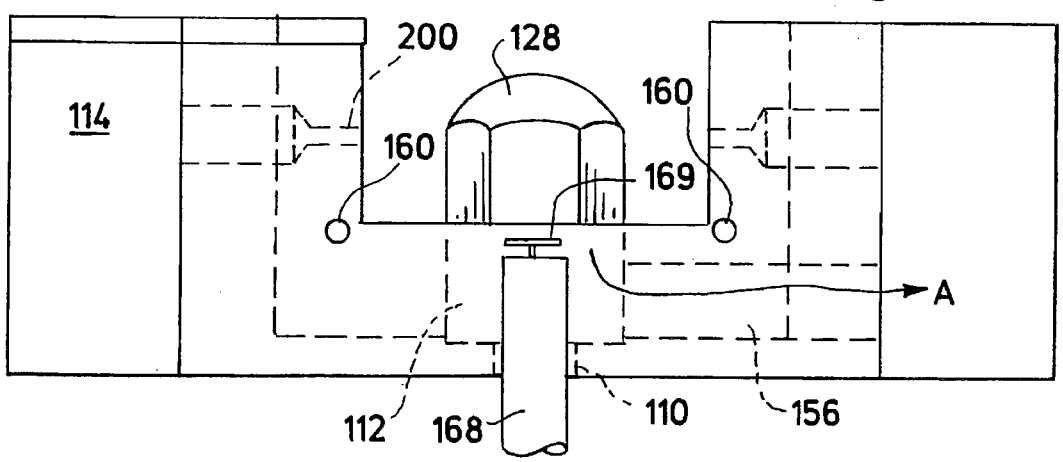
FIG. 9 is a side elevation of the preferred embodiment, with a vacuum flow line in the spray block.

The preferred embodiment for removing excess powder appears in FIG. 9. As depicted in the drawing, nozzle 168 moves through aperture 110 and chamber 112 of block 114 into nut 128, so sprayed powder is deposited on the threads (not shown) of nut 128. The chamber 112 forms a hollow member coaxially disposed around nozzle 168. To remove excess powder, a vacuum line 156, pulling in the direction of Arrow A, is bored through spray block 114. Jackets 160 are bored to permit flowing water to cool spray block 114. Without cooling, the pre-heated nut 128 would heat spray block 114, which would result in powder adhering to the sides of chamber 112 and vacuum line 156. This could eventually clog the device and make it inoperable.

Other aspects of the invention can remain as described above, such as nozzle tip 169, which directs the powder toward the threads, in a direction generally perpendicular to the axis of the motion of the spray nozzle. Fiber optic sensors 200 can be used with the appropriate mechanisms to maintain the supply, securing, and release of the coated fasteners care should be taken to fit aperture 110 tightly enough around nozzle 168 so that vacuum line 156 pulls the excess powder from the nut, and not air through aperture 110.

In the preferred embodiment of FIG. 9, the nozzle 168 must be below the spray block 114, whereas in other figures it is above. Variations to the structure of the invention to accommodate spraying from above or below the nut will be known and understood by those of skill in the art.

The modifications to the preferred embodiments described herein will be apparent to those skilled in the art. For example, air cylinder 16 can be replaced by a motor that moves the nozzle in and out of the fastener. Such changes and modifications can be made without departing from the spirit and scope of the present invention and without diminishing its attendant advantages. It is, therefore, intended that all such changes and modifications be covered by the following claims.

What is claimed is:

1. An apparatus for applying a heat fusible powdered resin to at least a portion of the threads of an internally threaded fastener having an internal diameter between approximately 0.1 and 1.5 inches, comprising:

a frame;

a powered actuator mounted on said frame;

an actuating member connected to and driven by said actuator;

means for heating the fastener;

a support for locating the heated fastener in a spray position;

a moveable application nozzle positioned adjacent the heated fastener in said spray position, said application nozzle having an axial length and carried by said actuating member, for insertion into the heated fastener and for applying said powdered resin to the threads of the heated fastener, said threads having surfaces positioned at an angle relative to the path of travel of said nozzle;

a nozzle tip located on said axial length of the application nozzle for controlling the application of the powdered resin;

a supply assembly for supplying the powdered resin to said nozzle; and vacuum means for removing excess powder that does not adhere to said threads, said vacuum means being disposed proximate to and on one side of the heated fastener, wherein said vacuum means comprises a cavity in said support and adjacent said one side of the heated fastener.

2. The apparatus of claim 1, wherein said fastener is a closed end fastener.

3. The apparatus of claim 2, wherein said powered actuator includes an air cylinder and said application nozzle includes a spray tube assembly substantially linearly actuated in and out of the heated fastener by said air cylinder.

4. The apparatus of claim 2, wherein the heated fastener in said spray position is seated within a spray block and positioning of the fastener in said spray block is controlled by an escapement mechanism.

5. The apparatus of claim 4, wherein said escapement mechanism comprises a plurality of pistons positioned in the path to said spray position of said fasteners whereby extension and retraction of said pistons controls the procession of said fasteners into said spray position.

6. The apparatus of claim 1, wherein said powered actuator includes a motor and said application nozzle includes a spray tube assembly actuated in and out of the heated fastener by said motor.

7. The apparatus of claim 1, wherein said nozzle tip includes a surface for directing the powdered resin in a direction generally perpendicular to the motion of said nozzle.

8. The apparatus of claim 1 wherein said vacuum means further comprises a hollow member coaxially disposed around said application nozzle.

9. An apparatus for applying a coating of resin material onto the internal threads of an internally threaded closed-end fastener, comprising:

a frame;

a powered actuator mounted on said frame;

first and second actuating members connected to and driven by said actuator;

a powdered resin nozzle mechanism carried by said first actuating member; said nozzle mechanism including a resin nozzle tip disposed coaxially within a vacuum nozzle; said resin nozzle tip being movable relative to said vacuum nozzle from a retracted position to an extended spray position within said closed-end fastener; and said vacuum nozzle having a tapered fastener-engaging surface to center said fastener relative to said resin nozzle tip and to seal non-threaded portions of said fastener from said resin material;

a powdered resin supply assembly for supplying powdered resin to said nozzle mechanism; and at least one adjustable sensor operatively associated with said second actuating member for sensing the position of said second actuating member and for controlling the application of said coating of resin material onto the threads of said closed-end fastener.

10. The apparatus of claim 9, wherein a plurality of said sensors are employed to control the supply of powdered resin to said nozzle mechanism.

11. The apparatus of claim 9 wherein said actuator is an air cylinder and piston.

12. The apparatus of claim 9, further including means for locating said closed-end fastener in position to receive said nozzle tip while said nozzle tip is extended.

13. The apparatus of claim 9 wherein said at least one sensor is photoelectric.

14. The apparatus of claim 9 wherein said first and second actuating members comprise a pair of parallel actuator rods that move in unison by the operation of said actuator.

15. An apparatus for applying a heat fusible powdered resin to at least a portion of the threads of an internally threaded fastener having an internal diameter between approximately 0.1 and 1.5 inches, comprising:

a frame;

a powered actuator mounted on said frame;

an actuating member connected to and driven by said actuator;

means for heating to the fastener;

a support for locating the heated fastener in a spray position;

a moveable application nozzle positioned adjacent one side of the heated fastener in said spray position, said application nozzle having an axial length and carried by said actuating member, for insertion into the heated fastener and for applying said powdered resin to the threads of the heated fastener, said threads having surfaces positioned at an angle relative to the path of travel of said nozzle;

a nozzle tip located on said axial length of the application nozzle for controlling the application of the powdered resin;

a supply assembly for supplying the powdered resin to said nozzle; and a vacuum mechanism for removing excess powder that does not adhere to said threads, said vacuum mechanism being disposed proximate to and on said one side of the heated fastener, wherein said vacuum mechanism comprises a cavity in said support and adjacent said one side of the heated fastener.

16. An apparatus for applying a coating of resin material onto the internal threads, of an internally threaded closed-end fastener, comprising:

a frame;

a powered actuator mounted on said frame;

first and second actuating members connected to and driven by said actuator;

a powdered resin nozzle mechanism carried by said first actuating member; said nozzle mechanism including a resin nozzle tip disposed coaxially within a vacuum nozzle; said resin nozzle tip being movable relative to said vacuum nozzle from a retracted position to an extended spray position within said closed-end fastener; and said vacuum nozzle having a tapered fastener-engaging surface to center said fastener relative to said resin nozzle tip and to seal non-threaded portions of said fastener from said resin material;

a powdered resin supply assembly for supplying powdered resin to said nozzle mechanism; and at least one adjustable sensor operatively associated with at least one of said actuating members for sensing the position of one of said actuating members and for controlling the application of said coating of resin material onto the threads of said closed-end fastener.

* * * * *